(12) United States Patent
Suzuki et al.

(10) Patent No.: US 7,644,976 B2
(45) Date of Patent: Jan. 12, 2010

(54) DOOR OPENING AND CLOSING APPARATUS FOR VEHICLE

(75) Inventors: Shigeyuki Suzuki, Kariya (JP); Yukio Isomura, Chita (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 37 days.

(21) Appl. No.: 12/076,539

(22) Filed: Mar. 19, 2008

(65) Prior Publication Data

US 2008/0231074 A1  Sep. 25, 2008

(30) Foreign Application Priority Data

Mar. 20, 2007  (JP) ............... 2007-071691

(51) Int. Cl.
*E05D 11/00* (2006.01)
(52) U.S. Cl. ............... 296/146.12; 296/146.4; 296/155; 292/216; 49/216; 49/218; 49/219
(58) Field of Classification Search ........ 296/155, 296/146.4, 146.9, 146.11, 146.12, 49, 216, 296/218, 219; 292/216; 49/208, 209, 216, 49/218, 219
See application file for complete search history.

(56) References Cited

U.S. PATENT DOCUMENTS

| 4,110,934 | A | * | 9/1978 | Zens ........................ 49/218 |
| 5,921,613 | A | * | 7/1999 | Breunig et al. ............... 296/155 |
| 5,979,951 | A | * | 11/1999 | Shimura .................... 292/216 |
| 6,382,705 | B1 | * | 5/2002 | Lang et al. .............. 296/146.12 |
| 6,430,875 | B1 | * | 8/2002 | Clark et al. .................... 49/360 |
| 6,477,806 | B1 | * | 11/2002 | Asada et al. .................. 49/169 |
| 6,793,268 | B1 | * | 9/2004 | Faubert et al. ......... 296/146.12 |
| 7,337,581 | B2 | * | 3/2008 | Kriese .......................... 49/360 |

FOREIGN PATENT DOCUMENTS

JP     5-78862 U    10/1993
SU      867705    * 9/1981

* cited by examiner

*Primary Examiner*—Patricia L Engle
*Assistant Examiner*—Pinel E Romain
(74) *Attorney, Agent, or Firm*—Buchanan Ingersoll & Rooney PC

(57) ABSTRACT

A door opening and closing apparatus for a vehicle includes a first hinge base adapted to be mounted to a vehicle body, a second hinge base adapted to be mounted to a vehicle door, a four-link hinge including a first hinge arm and a second hinge arm for connecting the first hinge base with the second hinge base, the four-link hinge supporting the vehicle door between a fully open position and a fully closed position, a fully open position locking mechanism adapted to be mounted on the vehicle door for locking the vehicle door relative to the vehicle body at the fully open position, and an unlocking mechanism adapted to be mounted on the fully open position locking mechanism for releasing a locked condition of the vehicle door.

6 Claims, 7 Drawing Sheets

DOOR OPENING AND CLOSING APPARATUS FOR VEHICLE

CROSS REFERENCE TO RELATED APPLICATIONS

This application is based on and claims priority under 35 U.S.C. §119 to Japanese Patent Application 2007-071691, filed on Mar. 20, 2007, the entire content of which is incorporated herein by reference.

FIELD OF THE INVENTION

This invention generally relates to a door opening and closing apparatus for a vehicle.

BACKGROUND

A known door opening and closing apparatus for a vehicle is disclosed in JP5-78862U as first and second embodiments thereof. According to the known door opening and closing apparatus for the vehicle according to the first embodiment of JP5-78862U, a striker is provided at a hinge arm (i.e., a bracket) fixedly mounted to a slide door, and a hook for engaging with the striker is provided on a body. According to the door opening and closing apparatus for the vehicle, when the slide door is fully open, the striker and the hook engage with each other for restricting the slide door from moving. A support lever rotatably supported by the hinge arm pulls the striker upward and thereby releases the engagement of the striker with the hook, and thus the restriction on the movement of the slide door is released.

According to a known door opening and closing apparatus for a vehicle according to the second embodiment of JP5-78862U, a striker is provided at a body, and a latch and a pawl are provided on a hinge arm (a bracket) fixedly mounted to a slide door. According to the known door opening and closing apparatus for the vehicle, when the slide door is fully open, the striker and the latch engage with each other and the pawl restricts the latch from rotating, thereby restricting the slide door from moving. The pawl is pulled upward to release the engagement of the striker with the latch to release the restriction on the movement of the slide door.

While the hinge arm (the bracket) is fixedly mounted to the vehicle door related to the known door opening and closing apparatus for the vehicle, a hinge arm of a door opening and closing apparatus having a four-link hinge is movable. Therefore, common application of the mechanical structure used in the known art into the door opening and closing apparatus having the four-link hinge causes following inconveniences. That is, a cable, which is used for an unlocking mechanism for releasing retention (i.e., holding) of the slide door, needs to be arranged along the four-link hinge arm. Then, the cable arrangement needs to have allowance for play of the cable, which produces wider variance in a length of the cable. Depending on the wire length, the stroke of the wire may be insufficient to release the retention of the door even when the cable is pulled. Further, a bending radius of the cable becomes smaller, where a higher sliding resistance is generated between the wire and a pipe enclosing the wire, and thus a higher force is required to release the retention of the slide door. Furthermore, a longer cable causes cost increase.

A need thus exists for a door opening and closing apparatus for a vehicle, which is not susceptible to the drawback mentioned above.

SUMMARY OF THE INVENTION

According to an aspect of the present invention, a door opening and closing apparatus for a vehicle includes a first hinge base adapted to be fixedly mounted to a vehicle body, a second hinge base adapted to be fixedly mounted to a vehicle door, a four-link hinge including a first hinge arm and a second hinge arm for connecting the first hinge base with the second hinge base in a manner so that the first hinge base and the second hinge base pivot relative to each other, the four-link hinge supporting the vehicle door between a fully open position and a fully closed position, a fully open position locking mechanism adapted to be fixedly mounted on the vehicle door for locking the vehicle door relative to the vehicle body at the fully open position, and an unlocking mechanism adapted to be fixedly mounted on the fully open position locking mechanism for releasing a locked condition of the vehicle door at the fully open position achieved by means of the fully open position locking mechanism.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
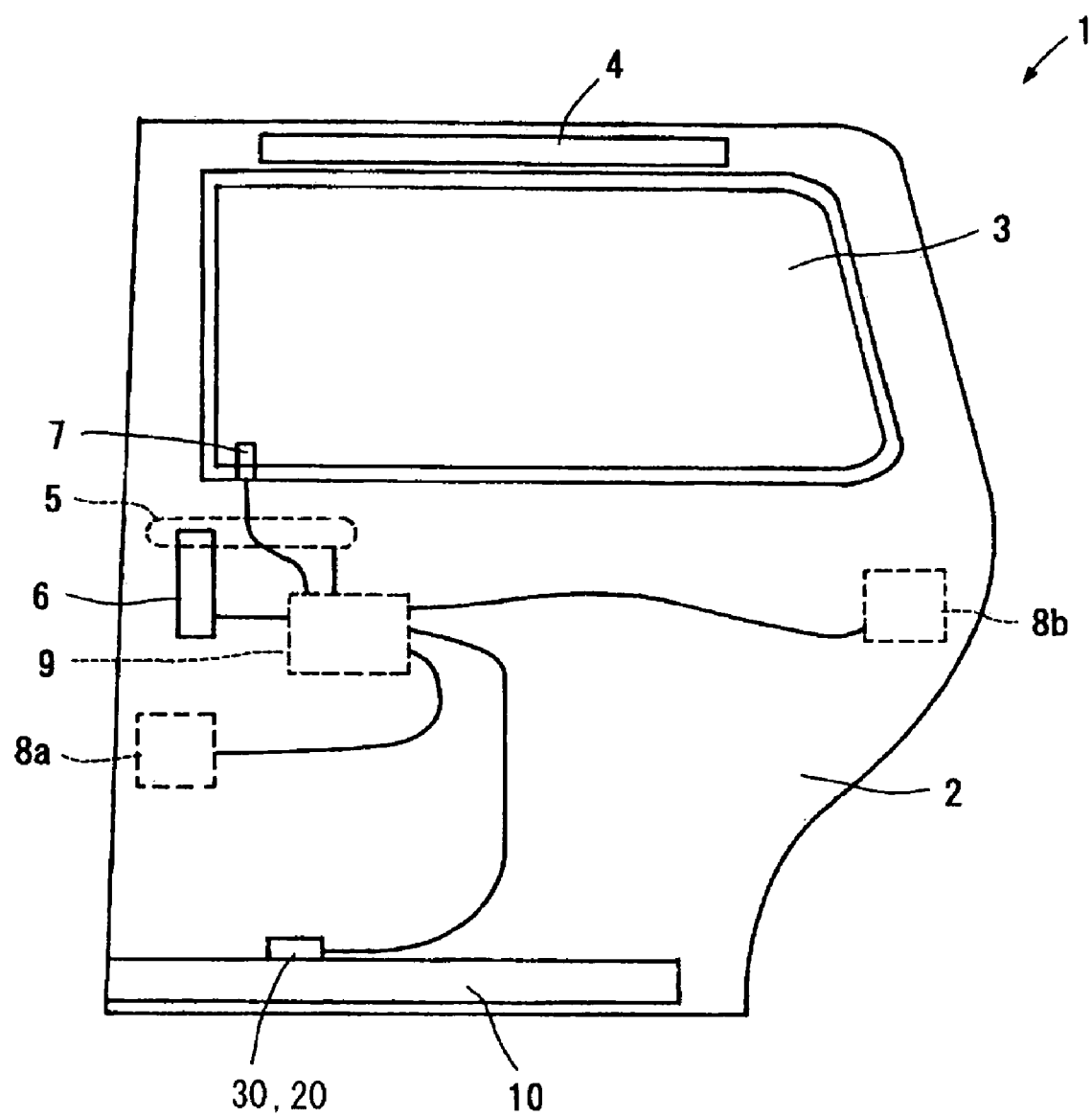
FIG. 1 is a front view of a slide door related to a door opening and closing apparatus for a vehicle (i.e., a door opening and closing apparatus) according to one embodiment of the present invention, when viewed from within the vehicle.

An embodiment of the present invention will be described below with reference to the attached drawings. As shown in FIG. 1, a window glass 3 is provided on an upper portion of a door body 2 to be movable upwardly and downwardly. A four-link hinge 4 is provided on the upper portion of an inner surface of the slide door 1 and a four-link hinge 10 is provided on a lower portion of the inner surface of the slide door 1 so that the four-link hinges 4 and 10 are positioned between the inner surface of the slide door 1 and a vehicle body. The four-link hinge 10 is provided with an unlocking mechanism 30 and a below-mentioned fully open position locking mechanism 20 (i.e., a mechanism for locking, in other words, for holding the slide door 1 at the fully open position). An outer door handle 5 is provided on an outer surface of the slide door 1, and an inner door handle 6 and a door locking knob 7 are provided on the inner surface of the slide door 1. Fully closed position locking mechanisms 8a and 8b (i.e., mechanisms for locking the slide door 1 in a fully closed position) are respectively provided in an internal portion of the slide door 1, in front and end portions thereof in a longitudinal direction of the vehicle. A remote control unit 9 is provided in the internal portion of the slide door 1 and connected to each of the unlocking mechanism 30, the outer door handle 5, the inner door handle 6, the door locking knob 7 and the fully closed position locking mechanisms 8a and 8b by means of cables. An operating force applied to the outer door handle 5, the inner door handle 6 or the door locking knob 7 is transmitted to the fully closed position locking mechanisms 8a and 8b or the unlocking mechanism 30 via the remote control unit 9. The slide door 1 serves as a vehicle door.

Figure 2:
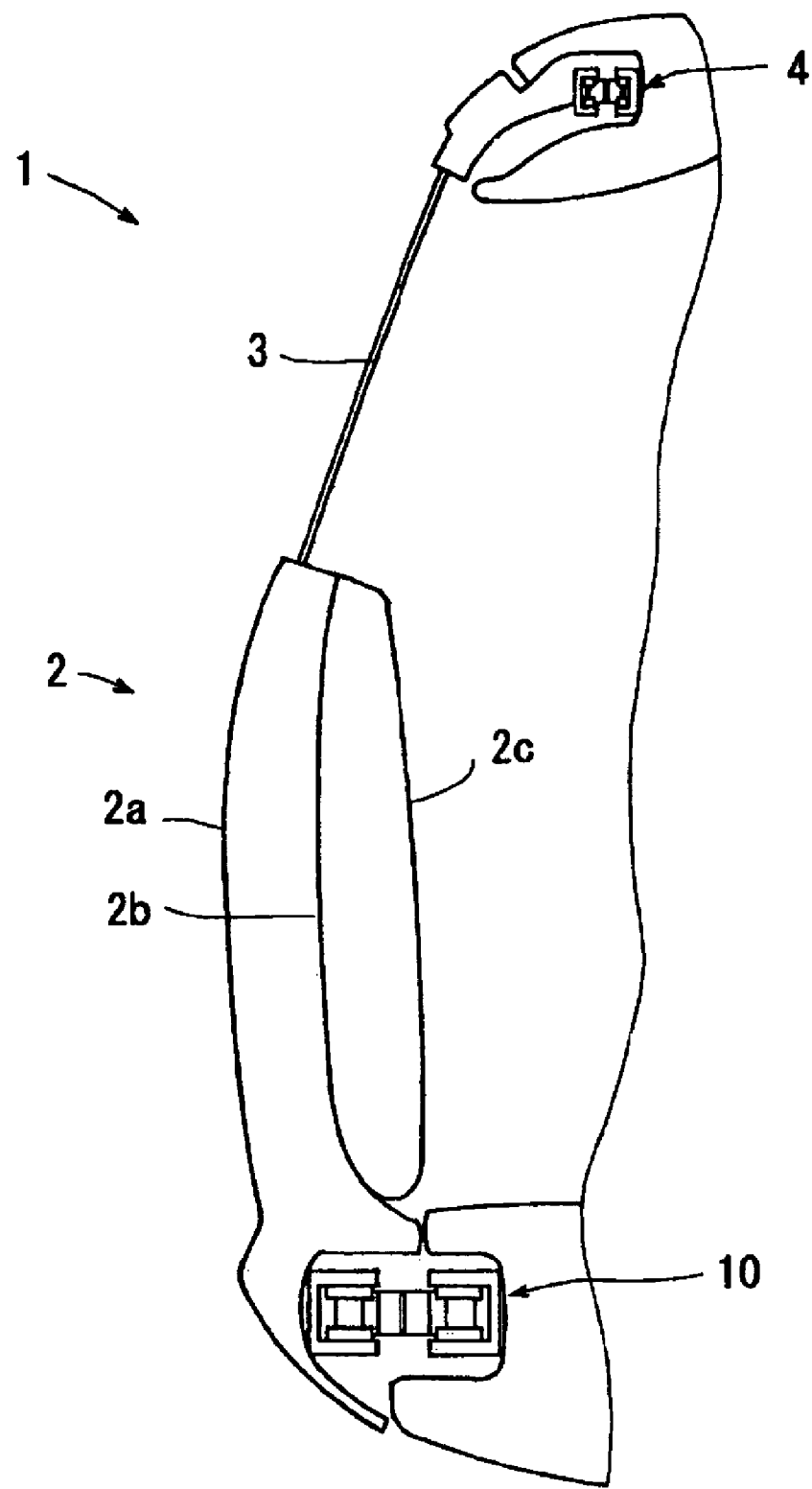
FIG. 2 is a longitudinal section view of the slide door related to the door opening and closing apparatus according to the embodiment of the present invention.

As shown in FIG. 2, the door body 2 of the slide door 1 is constituted by an outer panel 2a and an inner panel 2b joined together along their peripheries, and includes a trim panel 2c (i.e., a door lining) provided on an inner vehicle side of the door body 2.

Figure 3:
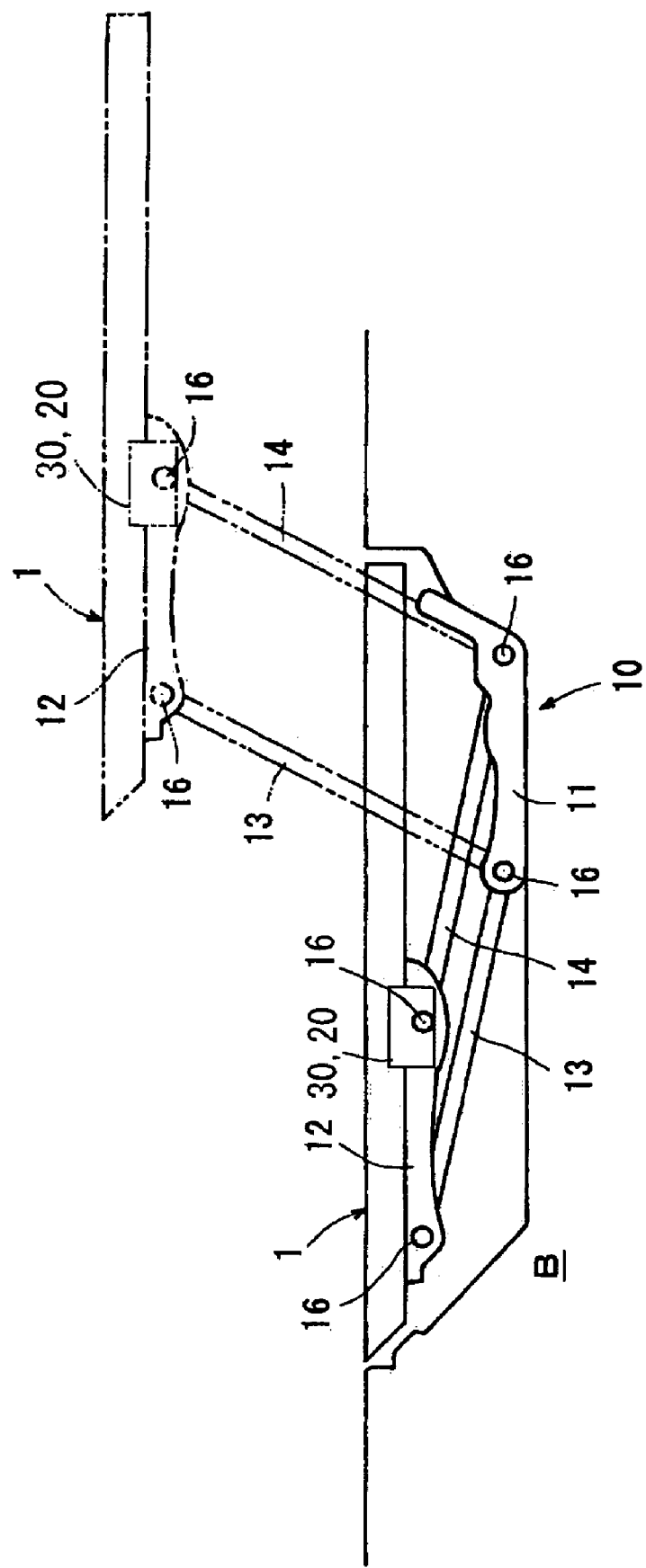
FIG. 3 is a cross section view of the slide door related to the door opening and closing apparatus according to the embodiment of the present invention, illustrating four-link hinges when viewed from above the vehicle.

As shown in FIG. 3, the four-link hinge 10 includes a first hinge base 11 fixedly mounted to a vehicle body B, a second hinge base 12 fixedly mounted to the slide door 1, a first hinge arm 13 and a second hinge arm 14. The first hinge base 11 is connected to ends of each of the first hinge arm 13 and the second hinge arm 14 by means of two hinge pins 16 and 16 respectively, and the second hinge base 12 is connected to the other ends of each of the first hinge arm 13 and the second hinge arm 14 by means of another two hinge pins 16 and 16 respectively so that the second hinge base 12 is pivotable relative to the first hinge base 11. In FIG. 3, the slide door 1 in a fully closed condition is drawn in full lines and the slide door 1 in a fully open condition is drawn in double-dotted lines. A side where the first hinge arm 13 is positioned is a front of the vehicle and a side where the second hinge arm 14 is positioned is a rear of the vehicle.

Figure 4:
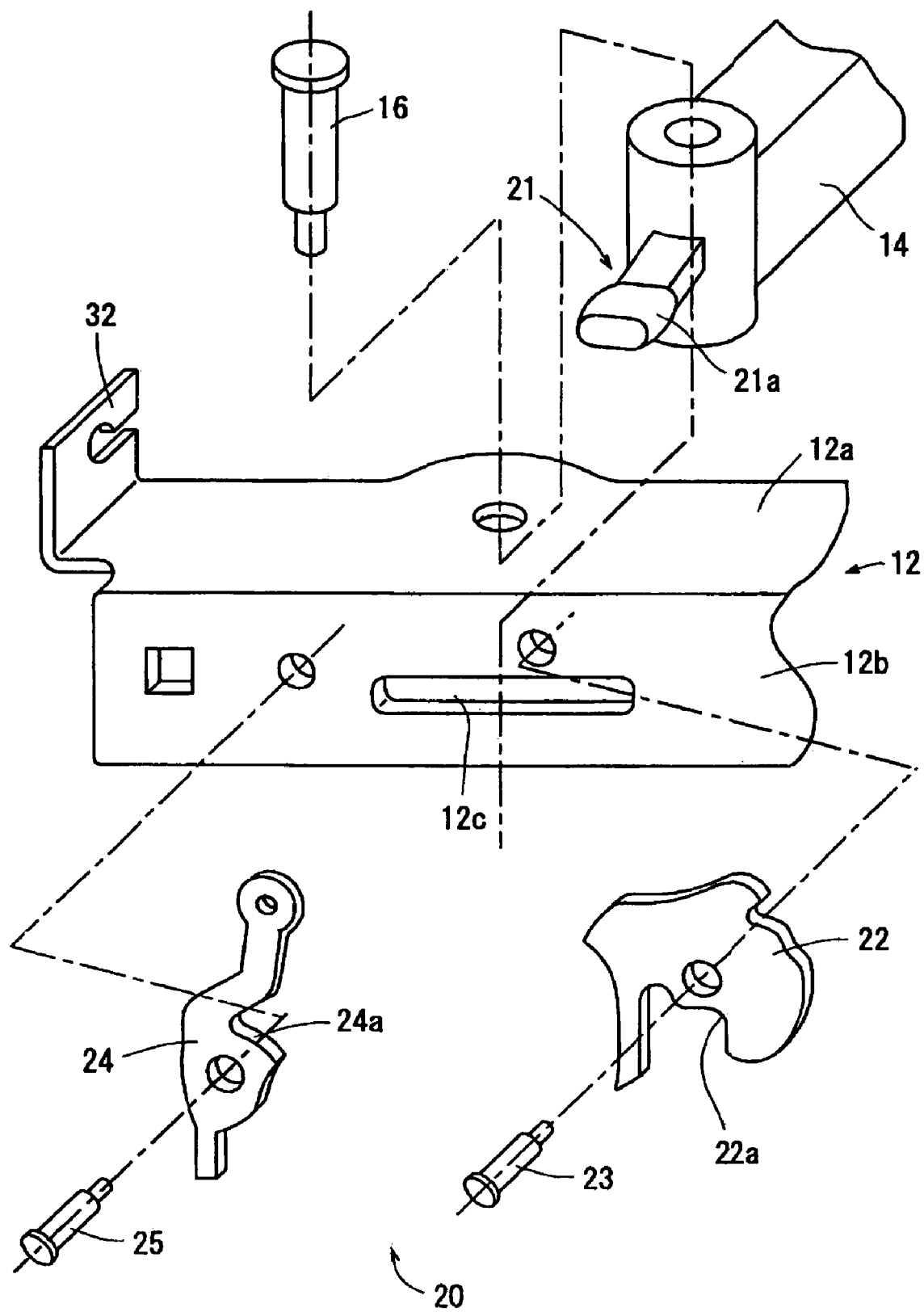
FIG. 4 is an exploded view of a fully open position locking mechanism related to the door opening and closing apparatus according to the embodiment of the present invention.
Figure 5:
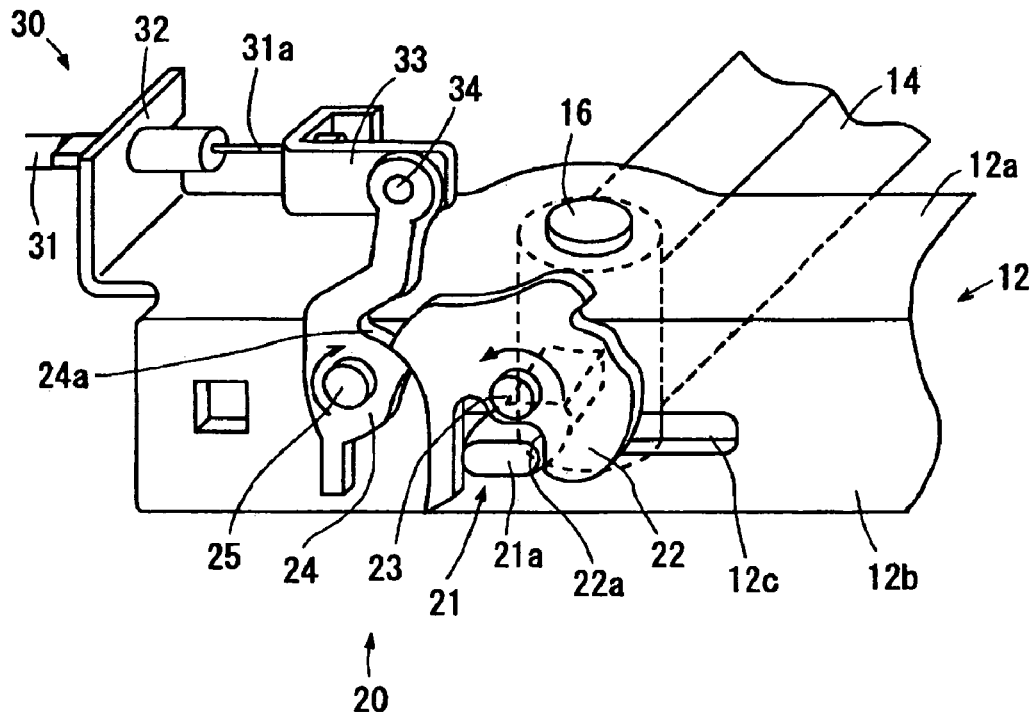
FIG. 5 is an assembly diagram of the fully open position locking mechanism related to the door opening and closing apparatus according to the embodiment of the present invention.

As shown in FIG. 4 and FIG. 5, the fully open position locking mechanism 20 includes a striker 21, a latch 22 and a pawl 24. The striker 21 is provided at an end portion of the second hinge arm 14 and includes a flattened sphere-like portion 21a at an end portion thereof. The flattened sphere-like portion 21a is of a flattened spherical shape. The second hinge arm 14 includes a horizontal surface 12a having a rectangular plate shape, and a vertical surface 12b formed at a longitudinal edge side of the horizontal surface 12a by being bent downward at right angles. The vertical surface 12b includes an insertion slot 12c formed thereon in a longitudinal direction thereof, through which the striker 21 is inserted in a manner so that the striker 21 is movable in the insertion slot 12c in a lateral direction thereof. The second hinge arm 14 is pivotable about the hinge pin 16 and supported by the horizontal surface 12a in a state where the striker 21 is inserted through the insertion slot 12c.

Figure 6:
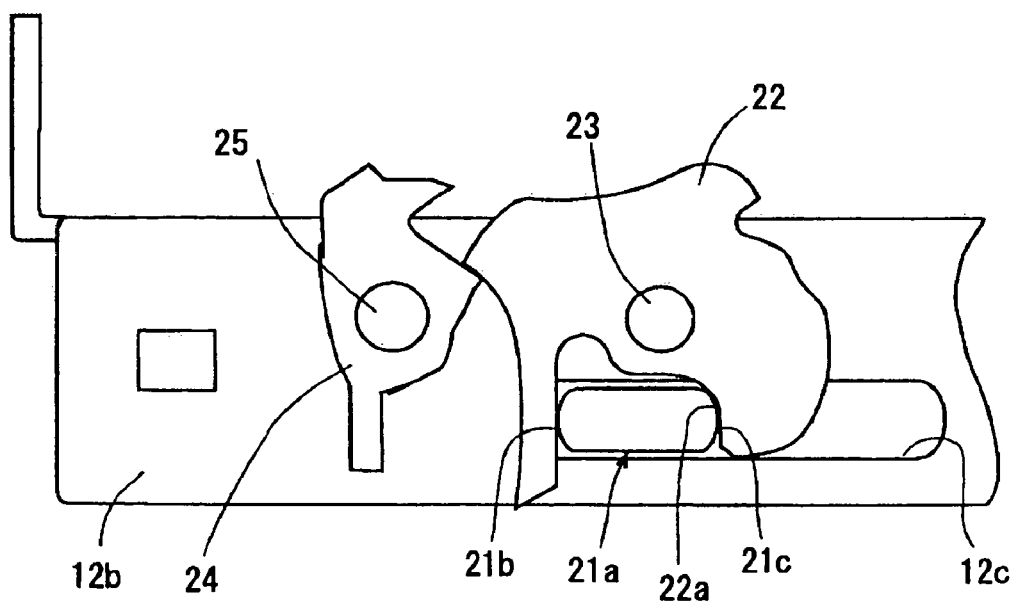
FIG. 6 is a front view of the fully open position locking mechanism, in an engaged condition, related to the door opening and closing apparatus according to the embodiment of the present invention.
Figure 7:
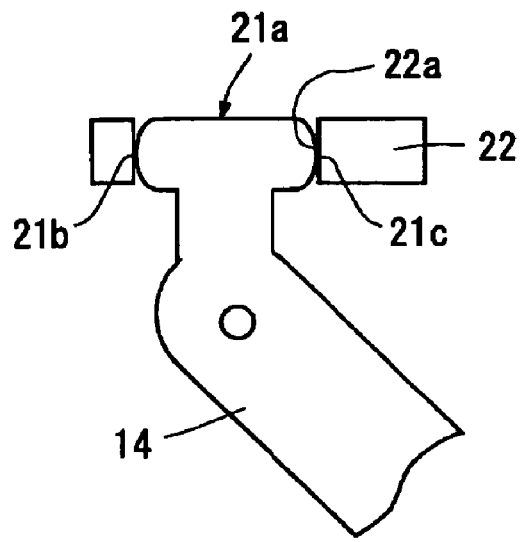
FIG. 7 is a bottom view of the fully open position locking mechanism, in the engaged condition, related to the door opening and closing apparatus according to the embodiment of the present invention.
Figure 8:
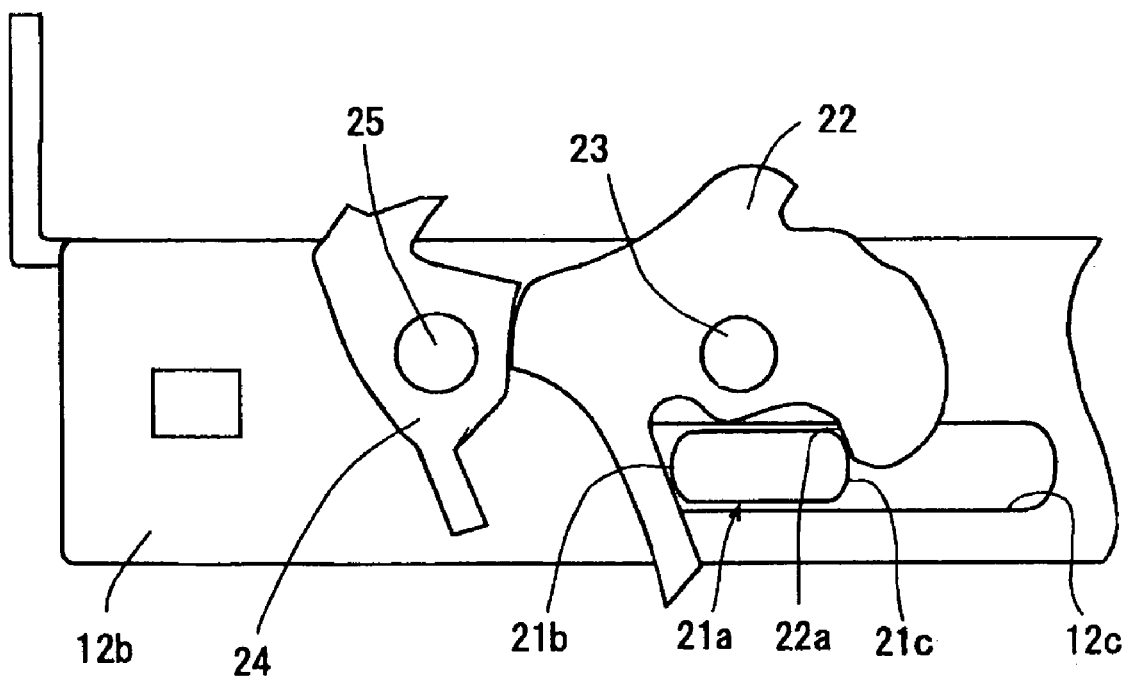
FIG. 8 is a front view of the fully open position locking mechanism, at a beginning of engagement, related to the door opening and closing apparatus according to the embodiment of the present invention.
Figure 9:
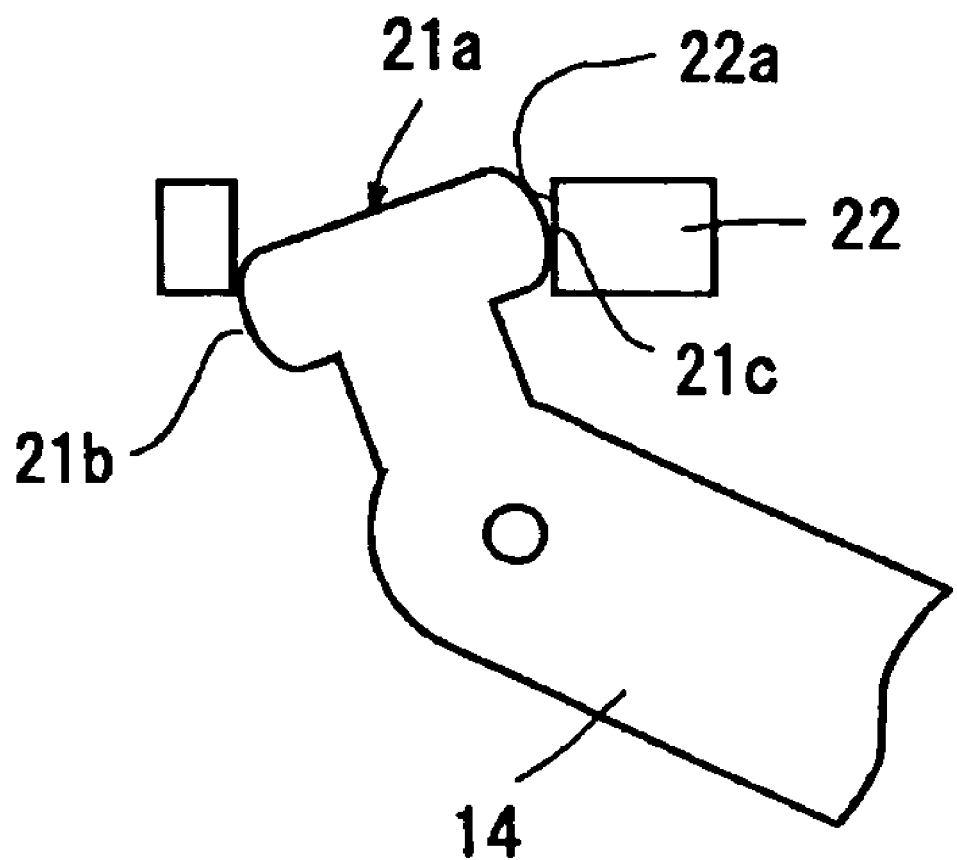
FIG. 9 is a bottom view of the fully open position locking mechanism, at the beginning of the engagement, related to the door opening and closing apparatus according to the embodiment of the present invention.

The latch 22 and the pawl 24 are supported by the vertical surface 12b so as to be pivotable about a pin 23 and a pin 25 respectively. The latch 22 engages with the striker 21 when the slide door is at the fully open position. The pawl 24 restricts, by engaging with the latch 22, the latch 22 from rotating in an engagement releasing direction that disengages the latch 22 from the striker 21. The latch 22 includes a notch 22a into which the flattened sphere-like portion 21a of the striker 21 is fitted. The flattened sphere-like portion 21a of the striker 21 includes a first surface 21b and a second surface 21c each having an arc shape along a longitudinal direction thereof (i.e., along a vertical direction in FIG. 7) and also along a vertical direction thereof (i.e., along a vertical direction in FIG. 6). The first and second surfaces 21b and 21c contact with a surface of the notch 22a in a state where the flattened sphere-like portion 21a is fitted into the notch 22a. Therefore, there is no excessive clearance either between the first surface 21b of the flattened sphere-like portion 21a and the notch 22a, or between the second surface 21c of the flattened sphere-like portion 21a and the notch 22a respectively when the flattened sphere-like portion 21a is fitted into the notch 22a, thereby suppressing generation of a noise and controlling looseness of the slide door 1 while the slide door 1 is locked, in other words, retained at the fully open position. The pawl 24 includes a contact portion 24a which comes in contact with the latch 22 for restricting the latch 22 from rotating counterclockwise. The latch 22 is biased counterclockwise, i.e., in a direction of the arrow drawn on the latch 22 in FIG. 5, by a spring provided around the pin 23. The pawl 24 is biased clockwise, i.e., in a direction of the arrow drawn on the pawl 24 in FIG. 5, by another spring provided around the pin 23.

The unlocking mechanism 30 includes an operation cable member 31 and a support bracket 32. The support bracket 32 is formed by bending one end of a shorter side of the horizontal surface 12a of the second hinge base 12 upwardly at right angles so that the support bracket 32 is integral with the horizontal surface 12a. A lever 33 is rotatably supported by the pawl 24 by means of a pin 34. The operation cable member 31 is supported by the support bracket 32, and one end of a cable 31a of the operation cable member 31 is fastened to the lever 33 and then linked to the pawl 24 via the lever 33. Therefore, when the operation cable member 31 is pulled, the lever 33, which is pivotable relative to the pawl 24, moves substantially parallel to a direction in which the operation cable member 31 is pulled. The movement of the lever 33 causes the pawl 24 to rotate counterclockwise about the pin 25, thereby disengaging the pawl 24 from the latch 22.

The fully closed position locking mechanisms 8a and 8b shown in FIG. 1 are of known types for restricting the slide door 1 from moving by engaging latches with strikers when the slide door 1 is at the fully closed position.

Next, an open and close operation of the slide door 1 related to the door opening and closing apparatus for the vehicle having the above-mentioned structure is described. In a condition where the slide door 1 is at the fully closed position and the door locking knob 7 is pulled up, when the outer door handle 5 or the inner door handle 6 is pulled and the slide door 1 is moved in a rear direction of the vehicle, the remote control unit 9 unlocks the fully closed position locking mechanisms 8a and 8b. At this time, the contact portion 24a of the pawl 24 is disconnected from the latch 22 and the latch 22 is rotated counterclockwise by a predetermined angle compared to a condition illustrated in FIG. 5. The striker 21 is positioned to a right of the latch 22, in other words, the fully open position locking mechanism 20 is in an unlocked condition.

As the slide door 1 is slidably moved in the rear direction of the vehicle and approaches the fully open position, the flattened sphere-like portion 21a of the striker 21 comes to fit into the notch 22a of the latch 22. Since each of the first and second surfaces 21b and 21c has the arc shape along the longitudinal direction and in the vertical direction thereof, the flattened sphere-like portion 21a is smoothly fitted into the notch 22a, allowing appropriate clearance therebetween, thereby achieving a smooth fitted condition. As the slide door 1 is further slid in the rear direction of the vehicle, the striker 21 pushes the latch 22 to rotate clockwise in FIG. 5, against a biasing force applied by the spring provided around the pin 23. Thereby the contact portion 24a of the pawl 24 comes in contact with the latch 22, thus restricting the latch 22 from rotating counterclockwise. In this way, a locked condition is established as shown FIG. 5 and the slide door 1 is locked at the fully open position. As a result, the slide door 1 is slidably moved only when the outer door handle 5 or the inner door handle 6 is pulled.

In the condition where the slide door 1 is fully open and the door locking knob 7 is pulled up, when the outer door handle 5 or the inner door handle 6 is pulled to move the slide door 1 in the front direction of the vehicle, the remote control unit 9 causes the operation cable member 31 to be pulled. This allows the pawl 24 to rotate counterclockwise in FIG. 5, and then the contact portion 24a of the pawl 24 is disengaged from the latch 22. The latch 22 rotates counterclockwise by a predetermined angle by the biasing force applied by the spring provided around the pin 23, thereby disengaged from the striker 21. Then, the striker 21 moves rightward relative to the latch 22. In this way, the slide door 1 is slidably moved to the front direction of the vehicle. When the slide door 1 reaches the fully closed position, the slide door 1 is locked at the fully closed position by means of the fully closed position locking mechanisms 8a and 8b.

According to the embodiment, the fully open position locking mechanism 20 includes the striker 21 provided at the end portion of the second hinge arm 14, the latch 22 rotatably supported by the second hinge base 12 and engaging with the striker 21 when the slide door 1 is at the fully open position, and the pawl 24 rotatably supported by the second hinge base 12 and restricting the striker 21, by engaging with the latch 22, from rotating in the engagement releasing direction that disengages the latch 22 from the striker 21. This allows a simple arrangement of the operation cable member 31 of the unlocking mechanism 30 for releasing retention of the slide door 1, thereby overcoming possible insufficient stroke of the operation cable member 31a for releasing the retention of the slide door 1. The above-described structure also prevents the operation cable member 31 from having a small bending radius, and thus preventing an increment in the sliding resistance between the wire and a pipe enclosing the wire and requiring no high force to release the retention of the slide door 1. As result, durability of the operation cable member 31 is improved. Furthermore, the above-described structure contributes to a shorter length of the operation cable member 31 and avoids the need of protective parts for the operation cable member 31, thereby reducing production costs. Consequently, the door opening and closing apparatus for the vehicle according to the embodiment provides a stable manner for releasing the retention of the slide door 1, excellent durability and low cost.

According to the embodiment, the striker 21 engages with the latch 22 by allowing the flattened sphere-like portion 21a provided on the striker 21 to fit into the notch 22a provided on the latch 22. Since the striker 21 includes the flattened sphere-like portion 21a at the end portion thereof, the flattened sphere-like portion 21a and the notch 22a engage with each other by point contact. Consequently, the striker 21 and the latch 22 engage with each other reliably, thereby controlling the looseness of the slide door 1 while being locked at its fully open position.

According to the embodiment, the second hinge base 12 includes the horizontal surface 12a rotatably supporting the one end of the second hinge arm 14, the vertical surface 12b rotatably supporting the latch 22 and the pawl 24, and the insertion slot 12c into which the striker 21 is fitted in the condition where the striker 21 and the latch 22 are engaged. Consequently, the latch 22 and the pawl 24 are disposed on the second hinge base 12 in an optimum arrangement, thereby saving space.

According to the embodiment, the unlocking mechanism 30 includes the operation cable member 31 linked to the pawl 24 and releasing an engagement of the pawl 24 with the latch 22, and the support bracket 32 formed on the horizontal surface 12a of the second hinge base 12 to be integral therewith for supporting the operation cable member 31. Consequently, the number of parts is reduced and thus production costs are reduced.

According to the embodiment, the door opening and closing apparatus for the vehicle of the subject matter is used in a slide door, however, the apparatus may be used in other types of doors, for example, a back door.

According to the embodiment of this invention, the fully open position locking mechanism 20 includes the striker 21 provided at the end portion of the second hinge arm 14, the latch 22 rotatably supported by the second hinge base 12 for selectively engaging with and disengaging from the striker 21 so that the latch 22 engages with the striker 21 during the slide door 1 being at the fully open position, and the pawl 24 rotatably supported by the second hinge base 12 for selectively engaging with and disengaging from the latch 22 in a manner so that the engagement of the pawl 24 with the latch 22 restricts the latch 22 from rotating in a direction of releasing an engagement thereof with the striker 21.

According to the embodiment of this invention, the latch 22 includes the notch 22a formed thereon and the striker 21 includes the flattened sphere-like portion 21a formed thereon to be fitted into the notch 22a so that the striker 21 and the latch 22 engage with each other by allowing the flattened sphere-like portion 21a to be fitted into the notch 22a.

According to the embodiment of this invention, the second hinge base 12 includes the horizontal surface 12a rotatably supporting thereon ends of each of the first hinge arm 13 and the second hinge arm 14, the vertical surface 12b rotatably supporting the latch 22 and the pawl 24 thereon, and the insertion slot 12c provided on the vertical surface 12b for receiving the striker 21 therein upon the engagement of the striker 21 with the latch 22.

According to the embodiment of this invention, the latch 22 is biased counterclockwise and the pawl 24 is biased clockwise.

According to the embodiment of this invention, the unlocking mechanism 30 includes the operation cable member 31 linked to the pawl 24 and releasing the engagement of the pawl 24 with the latch 22 in a controlled manner responding to an operation of the remote control unit 9, and the support bracket portion 32 integrally formed on the horizontal surface 12a of the second hinge base 12 and supporting the operation cable member 31.

According to the embodiment of this invention, the operation cable member 31 releasing the engagement of the pawl 24 with the latch 22 in the controlled manner responding to the operation of the remote control unit 9 operates the pawl 24 to be rotated counterclockwise.

According to the embodiment of this invention, the striker 21 provided at the end portion of the second hinge arm 14 engages with the notch 22a formed on the latch 22 by the point contact including at least two contact points in the condition of the slide door 1 being fully open.

According to the embodiment of this invention, the latch 22 operatively engages with the second hinge arm 14 so as to rotate in response to a movement of the second hinge arm 14, and the pawl 24 and the latch 22 engage with each other in response to a rotating movement of the latch 22 for establishing a locked condition at the fully open position.

According to the embodiment of this invention, the insertion slot 12c formed on the vertical surface 12b of the second hinge base 12 is formed to extend in a longitudinal direction of the second hinge base 12.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A door opening and closing apparatus for a vehicle, comprising:
    a first hinge base adapted to be fixedly mounted to a vehicle body;
    a second hinge base adapted to be fixedly mounted to a vehicle door;
    a four-link hinge including a first hinge arm and a second hinge arm for connecting the first hinge base with the second hinge base in a manner so that the first hinge base and the second hinge base pivot relative to each other, the four-link hinge supporting the vehicle door between a fully open position and a fully closed position;
    a fully open position locking mechanism adapted to be fixedly mounted on the vehicle door for locking the vehicle door relative to the vehicle body at the fully open position; and
    an unlocking mechanism adapted to be fixedly mounted on the fully open position locking mechanism for releasing a locked condition of the vehicle door at the fully open position achieved by means of the fully open position locking mechanism,
    wherein the fully open position locking mechanism includes a striker provided at an end portion of the second hinge arm, a latch rotatably supported by the second hinge base for selectively engaging with and disengaging from the striker so that the latch engages with the striker during the vehicle door being at the fully open position, and a pawl rotatably supported by the second hinge base for selectively engaging with and disengaging from the latch in a manner so that an engagement of the pawl with the latch restricts the latch from rotating in a direction of releasing an engagement thereof with the striker, and
    wherein the latch includes a notch formed thereon and the striker includes a flattened sphere-like portion formed thereon to be fitted into the notch so that the striker and the latch engage with each other by allowing the flattened sphere-like portion to be fitted into the notch.

2. A door opening and closing apparatus for a vehicle, comprising:
    a first hinge base adapted to be fixedly mounted to a vehicle body;
    a second hinge base adapted to be fixedly mounted to a vehicle door;
    a four-link hinge including a first hinge arm and a second hinge arm for connecting the first hinge base with the second hinge base in a manner so that the first hinge base and the second hinge base pivot relative to each other, the four-link hinge supporting the vehicle door between a fully open position and a fully closed position;
    a fully open position locking mechanism adapted to be fixedly mounted on the vehicle door for locking the vehicle door relative to the vehicle body at the fully open position; and
    an unlocking mechanism adapted to be fixedly mounted on the fully open position locking mechanism for releasing a locked condition of the vehicle door at the fully open position achieved by means of the fully open position locking mechanism,
    wherein the second hinge base includes a horizontal surface rotatably supporting thereon ends of each of the first hinge arm and the second hinge arm, a vertical surface rotatably supporting the latch and the pawl thereon, and an insertion slot provided on the vertical surface for receiving the striker therein upon the engagement of the striker with the latch.

3. The door opening and closing apparatus for the vehicle set forth in claim 2, wherein the latch is biased counterclockwise and the pawl is biased clockwise.

4. The door opening and closing apparatus for the vehicle set forth in claim 2, wherein the insertion slot formed on the vertical surface of the second hinge base is formed to extend in a longitudinal direction of the second hinge base.

5. A door opening and closing apparatus for a vehicle, comprising:
    a first hinge base adapted to be fixedly mounted to a vehicle body;
    a second hinge base adapted to be fixedly mounted to a vehicle door;
    a four-link hinge including a first hinge arm and a second hinge arm for connecting the first hinge base with the second hinge base in a manner so that the first hinge base and the second hinge base pivot relative to each other, the four-link hinge supporting the vehicle door between a fully open position and a fully closed position;
    a fully open position locking mechanism adapted to be fixedly mounted on the vehicle door for locking the vehicle door relative to the vehicle body at the fully open position; and
    an unlocking mechanism adapted to be fixedly mounted on the fully open position locking mechanism for releasing a locked condition of the vehicle door at the fully open position achieved by means of the fully open position locking mechanism, wherein the fully open position locking mechanism includes a striker provided at an end portion of the second hinge arm, a latch rotatably supported by the second hinge base for selectively engaging with and disengaging from the striker so that the latch engages with the striker during the vehicle door being at the fully open position, and a pawl rotatably supported by the second hinge base for selectively engaging with and disengaging from the latch in a manner so that an engagement of the pawl with the latch restricts the latch from rotating in a direction of releasing an engagement thereof with the striker, and wherein the striker provided at the end portion of the second hinge arm engages with a notch formed on the latch by point contact including at least two contact points in a condition where the vehicle door is fully open.

6. A door opening and closing apparatus for a vehicle, comprising:

a first hinge base adapted to be fixedly mounted to a vehicle body;

a second hinge base adapted to be fixedly mounted to a vehicle door;

a four-link hinge including a first hinge arm and a second hinge arm for connecting the first hinge base with the second hinge base in a manner so that the first hinge base and the second hinge base pivot relative to each other, the four-link hinge supporting the vehicle door between a fully open position and a fully closed position;

a fully open position locking mechanism adapted to be fixedly mounted on the vehicle door for locking the vehicle door relative to the vehicle body at the fully open position; and an unlocking mechanism adapted to be fixedly mounted on the fully open position locking mechanism for releasing a locked condition of the vehicle door at the fully open position achieved by means of the fully open position locking mechanism, wherein the fully open position locking mechanism includes a striker provided at an end portion of the second hinge arm, a latch rotatably supported by the second hinge base for selectively engaging with and disengaging from the striker so that the latch engages with the striker during the vehicle door being at the fully open position, and a pawl rotatably supported by the second hinge base for selectively engaging with and disengaging from the latch in a manner so that an engagement of the pawl with the latch restricts the latch from rotating in a direction of releasing an engagement thereof with the striker, and wherein the latch operatively engages with the second hinge arm so as to rotate in response to a movement of the second hinge arm, and the pawl and the latch engage with each other in response to a rotating movement of the latch for establishing the locked condition at the fully open position.

* * * * *